July 23, 1940.  A. W. JONES  2,209,024

VALVE

Filed Dec. 16, 1938  3 Sheets-Sheet 1

Inventor
Arthur W. Jones
by Simon Broder
his Attorney

July 23, 1940.　　　　A. W. JONES　　　　2,209,024
VALVE
Filed Dec. 16, 1938　　　3 Sheets-Sheet 2

Inventor
Arthur W. Jones
by Simon Broder
his Attorney

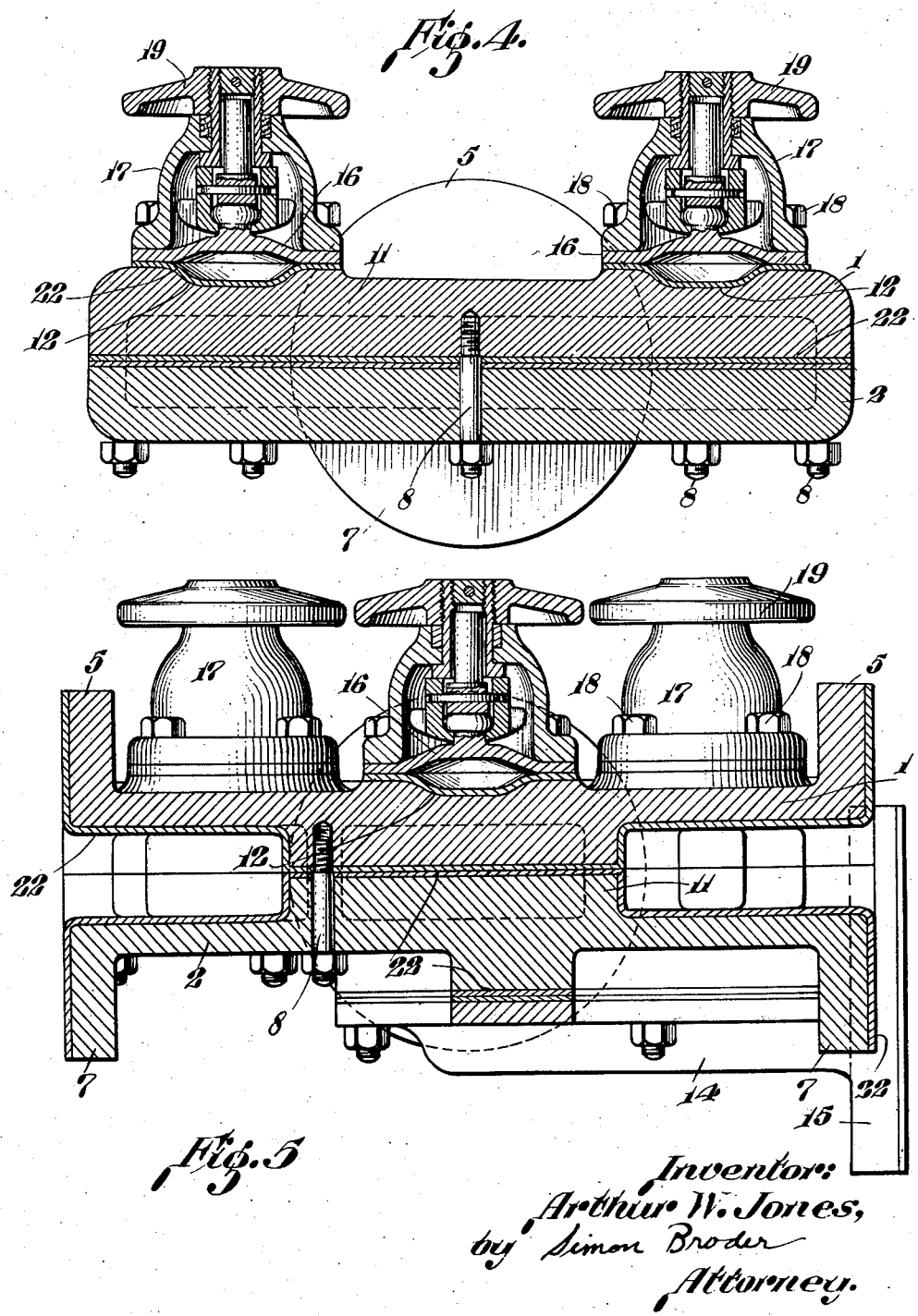

Patented July 23, 1940

2,209,024

UNITED STATES PATENT OFFICE 2,209,024

VALVE

Arthur Wansbrough Jones, Newport, England, assignor to Saunders Valve Company Limited, Grange Road, Cwmbran, England Application December 16, 1938, Serial No. 246,229
In Great Britain December 20, 1937

2 Claims. (Cl. 277—57)

The present invention relates to fluid controlling apparatus for directing fluids between a plurality of inlets and outlets and/or mixing fluids from two or more inlets for distribution to one or more outlets.

An object of this invention is to provide a simple compact and attractive unit as compared with the collection of valves interconnecting pipes and elbow pieces which would otherwise be required to obtain the same control of the various fluids.

A further object is to provide an integral unit for effecting the desired result which can be lined with a corrosion resisting material.

These and other objects will become apparent from the following description of embodiments of the invention illustrated in the accompanying drawings, in which—

Figs. 4 and 5 are sections of Fig. 1 on the lines IV—IV and V—V respectively.

Figure 1:
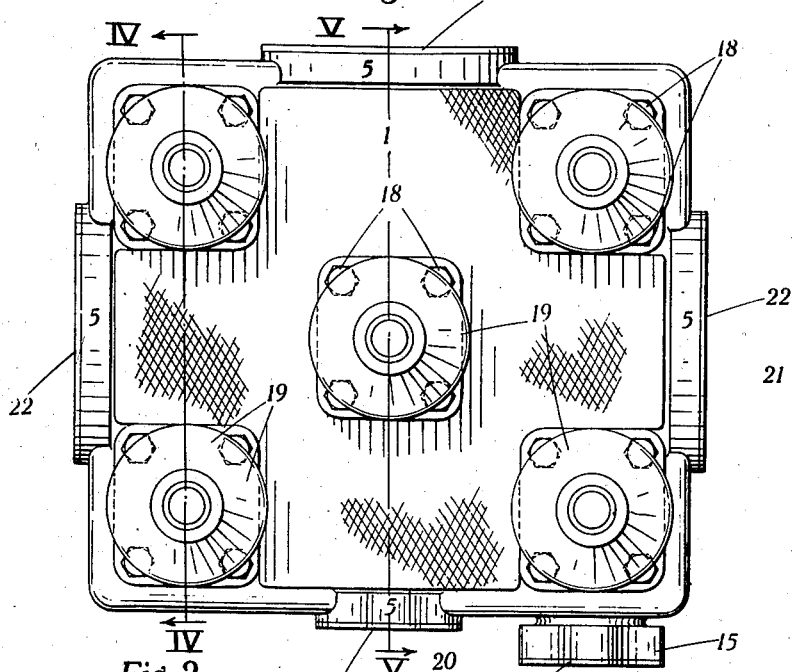
Fig. 1 is a plan view of a valve panel for a water purification plant incorporating the invention.
Figure 2:
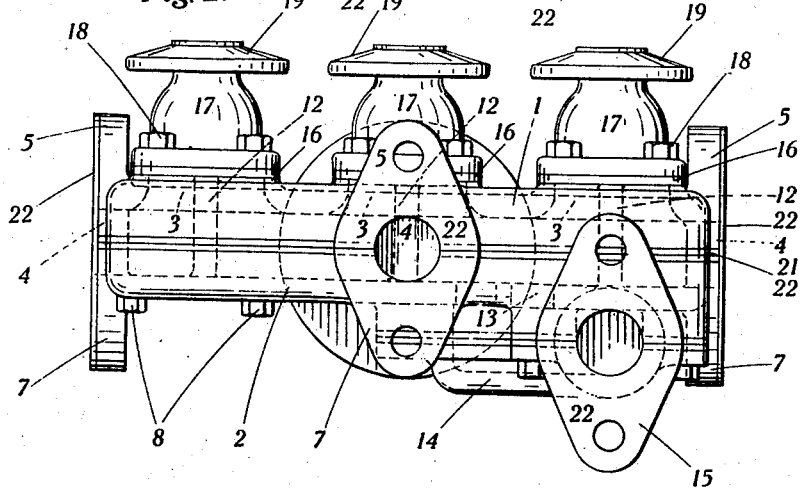
Fig. 2 is a side elevation of the panel.
Figure 3:
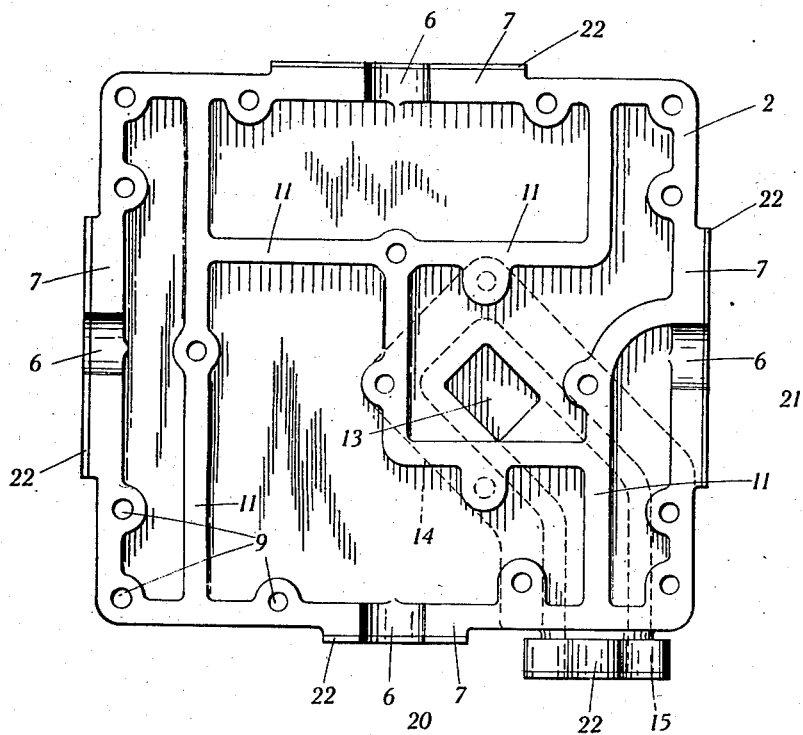
Fig. 3 is a plan view of the bottom half of the valve panel.

Referring now to Figs. 1 to 5, the valve panel incorporates five diaphragm valves. The main panel body is split into a top body part 1 and bottom body part 2.

The top part 1 has five apertures 3 in its upper face. Along its edge are four semi-circular openings 4, with attendant half flanges 5. The bottom part 2 has corresponding semi-circular edge openings 6, with attendant half flanges 7. The two parts are rubber lined internally and are secured together by studs 8 passing through holes 9 in the bottom part 2, and tapped into the top part 1. Various passages are formed within the panel body by dividing walls 11 half in the top and half in the bottom parts of the body. Barriers with concave upper edges 12 intersect the passages at points opposite the openings 3. In the bottom face of the bottom part 2 there is an aperture 13. A channel shaped bye-pass 14 with a flange 15 on its end is bolted direct to the bottom of the part 2, thus connecting the aperture 13 to the opening with the flange 15.

Flexible diaphragms 16 are mounted across the apertures 3 and are secured there by domed bonnets 17, bolted by studs 18 to the top of the part 1. These bonnets accommodate valve actuating gear operated by the handwheel 19.

Flow through the various passages formed by the walls 11 is controlled at the barriers 12 by operation of the various handwheels 19 opposite them to bring their respective diaphragms 16 into and out of contact with the said barriers 12.

It will be observed that innumerable combinations of flow from two or more openings may be mixed in the panel before reaching an outlet. Further it will be understood that the bye-pass 14 is only needed on account of the necessity for connecting the space with which the aperture 13 communicates direct with a pipe on the side 20 of the panel. If this space could have been connected to a pipe on the side 21 of the panel, then no bye-pass would have been required and a further channel within the panel with a suitable flanged opening could have been provided. It will be appreciated however that often the connecting pipes cannot conveniently be brought to the appropriate side of the panel and in such cases a bye-pass should be used.

A valve panel as described may be easily lined with a corrosion resisting material such as rubber, lead, glass or the like, in accordance with the fluid or fluids being controlled; for all internal parts of the panel body are exposed when the body is separated into two halves and the rubber stock, lead or powdered glass as the case may be, may therefore be easily applied to the surface. It will be understood that this operation is very much simpler in such a panel as compared with the collection of valves, pipes and elbows which it supersedes. In fact there is of course a definite limit to the length of pipe and elbow which can be lined in this way. In Figs. 1 to 5 the rubber lining is indicated by the reference 22.

Figure 6:
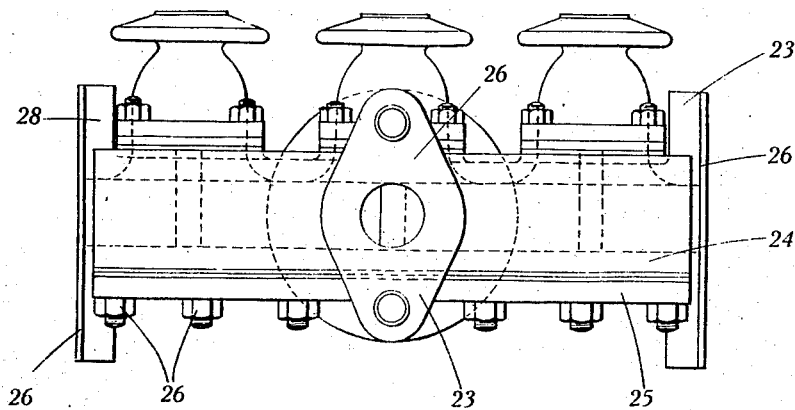
Fig. 6 is a view similar to Fig. 2 of a modification of the valve panel.

In Fig. 6 the same arrangements of valves is shown apart from the fact that there is no bye-pass. In this case however the panel is divided differently. The various outlets and inlets to the panel are provided by openings with attendant flanges 23 wholly in the top half 24. Likewise the various passages are provided wholly in the top half. The bottom of the part 24 is however open, and is closed by a flat plate 25 bolted to the part 24 by studs 26. As before, the panel is rubber lined which is easily accomplished when the back plate 25 is removed. The lining is indicated by the reference 26. The arrangement in Figs. 1 to 5 is intended more especially to be constructed of cast iron, whereas the arrangement of Fig. 6 is intended to be of fabricated welded metal construction.

It will be understood that innumerable variations of the invention may be effected utilising different numbers of valves and having varying numbers of inlets, outlets and bye-passes, the underlying feature being the provision of a simple compact distribution unit instead of a conglomeration of valves connected by individual pipes. Obviously a panel according to the invention, provides a very much more attractive and tidy appearance than such a collection of valves.

I claim:

1. A box shaped rubber lined fluid controlling valve system, comprising a rubber lined top body piece having an open bottom and apertures in the top and at least three semi-circular bottom edge openings with associated half flanges, dividing walls in said top body interconnecting said openings by passage into which said apertures open, barriers across said passages opposite said apertures, a rubber lined bottom body piece with a closed bottom and open top and corresponding semi-circular top edge openings with associated half flanges, corresponding dividing walls in said bottom body, corresponding barriers in said bottom body, means for securing said top body piece to said bottom body piece with the associated passages and barriers in register, diaphragms across said apertures, and means for selectively moving the diaphragms into contact with their associated barriers.

2. A box shaped rubber lined fluid controlling valve system, comprising a rubber lined body piece having an open bottom and apertures in the top and at least three openings in the edge with associated flanges, dividing walls in said body interconnecting said openings by passages into which said apertures open, barriers across said passages opposite said apertures, a rubber lined back plate, means for securing said plate upon the open bottom of said body, diaphragms across said apertures, and means for selectively moving said diaphragms into contact with their associated barriers.

ARTHUR WANSBROUGH JONES.